Nov. 19, 1957  C. E. SHEETZ  2,813,617
ARTICLE ALIGNING MACHINE
Filed Aug. 12, 1955
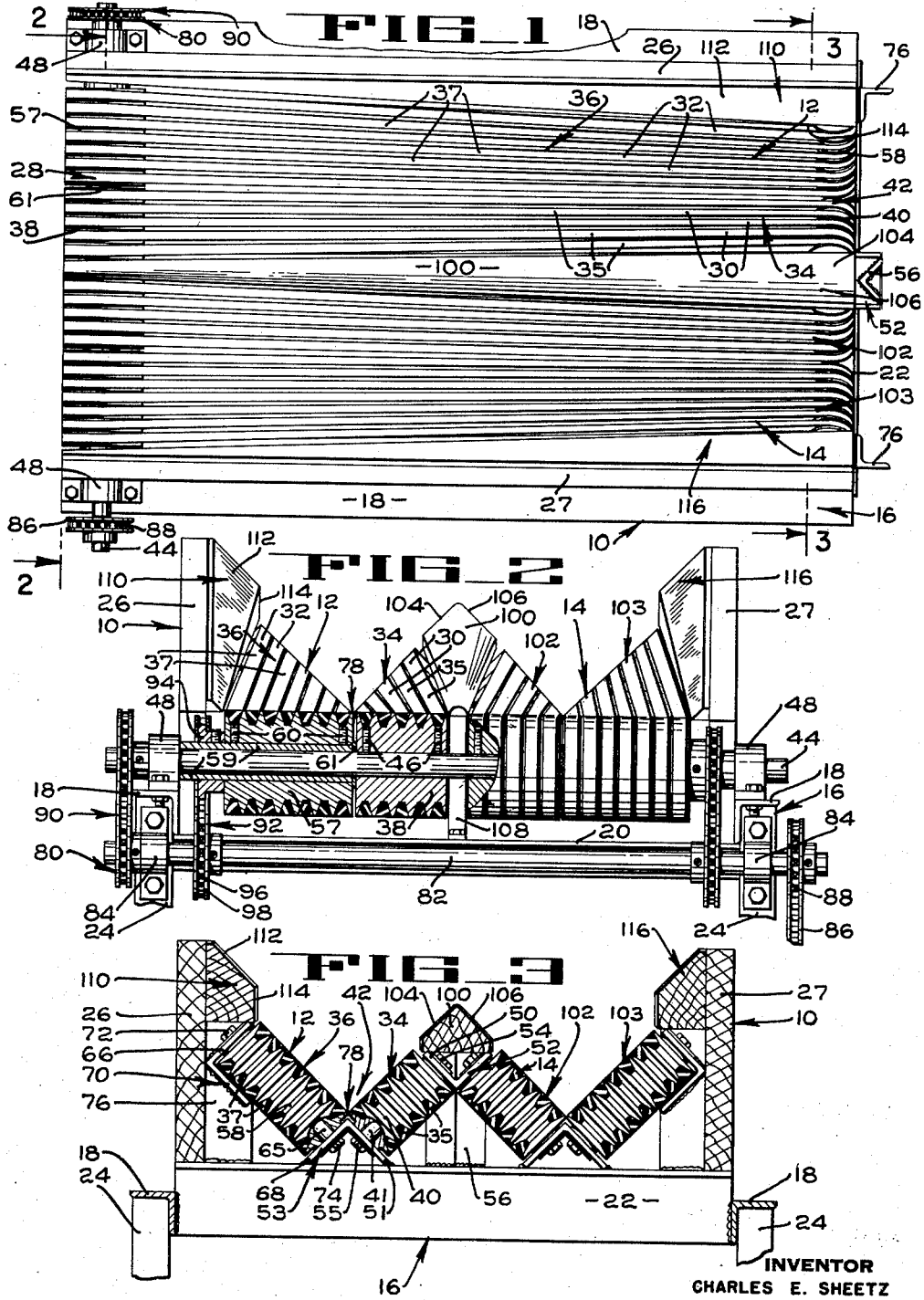
INVENTOR
CHARLES E. SHEETZ
BY Hans G. Hoffmeister
ATTORNEY

United States Patent Office 2,813,617
Patented Nov. 19, 1957

2,813,617
ARTICLE ALIGNING MACHINE

Charles E. Sheetz, Woodstock, Va., assignor to Food Machinery and Chemical Corporation, San Jose, Calif., a corporation of Delaware Application August 12, 1955, Serial No. 527,946

8 Claims. (Cl. 198—30)

The present invention pertains to article-aligning apparatus.

An object of the invention is to provide a machine for arranging articles delivered thereto in bulk, into single rows or files.

Another object of the invention is to provide a machine operable to place articles delivered thereto in random arrangement, into single file, and in such a gentle manner that the apparatus is especially adapted for handling articles apt to be bruised or abraded by rough handling, such as fruit.

Another object is to provide an aligner which will perform its operation in a highly efficient manner, and yet which is of such compact design that it requires only a relatively small amount of floor space for its installation.

Another object is to provide an aligner that will operate with equal efficiency upon articles of uniform size or upon articles of random sizes.

Another object of the present invention is to provide an aligning machine that is effective in preventing bridging of articles between parts of the aligner and/or between adjacent articles.

Another object of the invention is to provide means for effecting removal of entrained litter from produce being aligned.

Other and further objects and advantages of the invention will become apparent from the following description and the drawings, in which:

Fig. 1 is a plan of the aligning machine of the present invention.

Fig. 2 is an enlarged elevation partly in section, of the feed end of the machine shown in Fig. 1, taken along the lines 2—2 thereof.

Fig. 3 is an enlarged section along the lines 3—3 of Fig. 1.

During the processing of many types of produce, such as apples for example, it frequently is necessary that they be arranged into single rows or files before being delivered to sizers or other processing machines. The drawings illustrate an aligning machine 10 of the present invention, which is capable of receiving articles distributed at random over a wide conveyor and delivering them in single file to a processing machine (not shown). The aligning machine 10 comprises two substantially identical aligner units 12 and 14 positioned adjacent each other in side-by-side relation.

The frame 16 of the aligning machine 10 comprises horizontally disposed side members 18, end members 20 and 22 and legs 24, on which the units 12 and 14 of the machine 10 are mounted. While the aligning machine 10 consists of the two aligning units 12 and 14, it should be understood that one or many such units can be employed in a machine, depending upon the quantity of articles to be aligned. In any case, the machine 10 is provided with opposite sides 26 and 27 supported in any convenient manner from the side members 18 and upon the end members 20 and 22, respectively, of the frame 16.

The detailed description to follow, relating to construction and operation of the aligner units 12 and 14, will be directed principally to the unit 12, since the two units are of similar construction and a description of but one will suffice for a complete understanding of the invention.

In order to align articles such as apples, they are delivered to the aligner in bulk at the feed end 28 thereof. Apples delivered to the unit 12 are supported upon the upper runs 30 and 32 of two conveyor members 34 and 36, respectively, which are cooperatively associated in the unit 12. The conveyor members 34 and 36 are similar in construction, each comprising a series of V-belts 35 and 37, respectively.

The V-belts 35 of the conveyor member 34 are trained around a horizontally disposed compound sheave or pulley 38 (Figs. 1 and 2) at the feed or receiving end 28 of the unit 12, and around a smaller compound sheave or pulley 40 (Figs. 1 and 3) at the discharge end 42. The pulley 40 is inclined downwardly and inwardly at approximately 45°.

The pulley 38 (Fig. 2) is located on the inboard side of the feed end 28 of the unit 12, upon a transversely extending drive shaft 44 to which it is secured for rotation therewith by set screws 46. A pair of bearing blocks 48—48, one of which is disposed near each end of the shaft 44, are mounted upon the side members 18 (Fig. 2) and support the shaft 44 for rotation. The upper runs of the belts 35 are transversely aligned, thus cooperating to present a surface that is horizontal at the feed end 28 but which at the discharge end is inclined at 45 degrees, the direction of inclination being downwardly and inwardly, i. e., toward the companion conveyor member 36. In order to support the pulley 40 suitably inclined, it is mounted upon an angularly disposed shaft 41 on which the pulley may rotate. The shaft 41 extends between adjacent parallel legs 50 and 51 of upper and lower angle brackets 52 and 53, respectively, to which it is secured by bolts 54 and 55. The upper bracket 52 projects horizontally from a post 56 that is attached as by welding to the center of the frame end member 22, whereas the lower bracket 53 is securely mounted directly upon the same end member.

The belts 37 of the other conveyor member 36 are trained around a horizontally disposed compound sheave or pulley 57 at the feed end 28 of the unit 12 and around a smaller, inclined compound sheave or pulley 58 at the discharge end 42. The pulley 57 (Fig. 2) which is disposed outwardly of the unit 12, is secured to a sleeve 59 for rotation therewith by set screws 60. The sleeve 59 is mounted upon the drive shaft 44 so as to rotate thereon and is interposed between one of the bearing blocks 48 at one end and a thrust washer 61 at the other end, the latter bearing against the pulley 38 of the conveyor member 34. The upper runs of the belts 37 are transversely aligned and thus cooperate to present a surface that is horizontal and aligned with the conveying surface of the conveyor member 36 at its feed end 28, but which at its discharge end 42 is inclined in a direction opposite to that of the conveyor member 34. In order to support the pulley 58 suitably inclined, it is mounted upon an angularly disposed shaft 65 on which the pulley may rotate. The shaft 65 extends between adjacent, parallel legs 66 and 68 of an upper angle bracket 70 and the above-mentioned lower angle bracket 53, respectively, to which it is secured by bolts 72 and 74. The upper bracket 70 projects horizontally from a post 76 that is attached as by welding to the frame member 22 inwardly of the side 26. It will be noted (Fig. 3) that the inclined upper surfaces of the upper runs of the conveyor members 34 and 36 cooperate to form a trough 78 therebetween.

When the machine 10 is to be used to align certain kinds of articles, it is desirable to have one conveyor member advance at a higher rate of speed than the other, since such a speed differential of the two conveyor members 34 and 36 causes articles thereon to be channeled into single file within the trough 78 more quickly and at the same time eliminates bridging of articles that otherwise might impede their alignment. If one article, for instance, is supported upon or bridges two other articles which are in the apex of the trough, it is readily apparent that the bridging article will, in addition, be in contact with either the slow or fast moving conveyor member and its speed of advance, therefore, will be decreased or increased accordingly in relation to the articles which it is bridging. Hence, the bridging article will quickly be moved to a point where it may seat in the apex of the trough. Bridging of oblong articles which may contact and extend between the two conveyor members above the apex of the trough, is similarly eliminated by the different rate of movement of the two conveyor members. In the present embodiment, the conveyor member 34 is driven more slowly than the conveyor member 36, although both are driven by a single power train 80 (Fig. 2). In addition to the drive shaft 44, the power train 80 comprises an auxiliary shaft 82 that is rotatably mounted adjacent its opposite ends in bearings 84—84 that are bolted or otherwise secured to the legs 24 of the machine 10. Power is transmitted from any convenient driving motor (not shown) to the auxiliary shaft 82 by means of a chain 86 and a sprocket 88, the latter being fixed upon the shaft 82. A sprocket and chain arrangement 90 between the auxiliary shaft 82 and the drive shaft 44, drives the pulley 38 and the conveyor member 34 at a suitable speed determined by the characteristics of the articles to be handled. The conveyor member 36 is also driven from the auxiliary shaft 82 but at a higher speed than the conveyor member 34, by means of a sprocket and chain arrangement 92 comprising a sprocket 94 securely attached to the sleeve 59, a sprocket 96 rigid with the auxiliary shaft 82, and a chain 98 trained around both sprockets 94 and 96. These sprockets 94 and 96 of the sprocket and chain arrangement 92 are of a suitable ratio causing the conveyor member 36 to travel at the desired faster rate than that of the conveyor member 34.

To close the space between the units 12 and 14 and thereby to insure that articles deposited within the aligning machine 10 at the feed end 28 thereof, are directed positively into one or the other of the units 12, 14, a dividing strip 100 is provided between the two units. The stip 100 is coextensive in length with the sides 26 and 27 and forms in effect, continuations of the inclined article-supporting surfaces of the conveyor member 34 of unit 12 and of a similar conveyor member 102 of the adjoining aligner unit 14. Accordingly, the strip 100 has downwardly and outwardly inclined deflecting surfaces 104 and 106 which fill the gradually broadening space between the conveyor members 34 and 102. The end of the strip 100 adjacent the feed end 28 of the machine is held in place by a suitable strap 108 (Fig. 2) which is bolted to the end frame member 20 while the broader end of the strip is bolted or otherwise secured to the before-mentioned bracket 52 on the post 56. A suitably elongated deflector or fender 110 is provided on the side 26 to restrain articles against accidental lateral displacement from the moving belts 37, and includes an inclined surface 112 and a vertical surface 114. Another deflector or fender 116 similar to the fender 110 is provided on the side 27 and cooperates with a conveyor member 103 of unit 14 in the same manner as the fender 110 cooperates with the conveyor member 36.

It will be understood that in the event an aligning machine embodying the invention includes only one aligning unit, no divider strip 100 would be used and the fenders 110 and 116 would be positioned adjacent the edges of the outermost belts of that aligning unit. If, however, several aligning units are to be used in a single machine 10, a dividing strip 100 would be employed between each two adjacent aligning units while a fender would be used adjacent the outboard edge of each of the outermost aligner units.

The conveyor member 34 in the illustrated embodiment of the invention comprises five similar V-belts 35 while the conveyor member 36 comprises seven V-belts 37. This arrangement of belts has been found suitable for aligning a wide variety of articles. In the unit 14, the conveyor members 102 and 103 are the low speed and high speed conveyor members, respectively, and they are arranged oppositely to the conveyor members 34 and 36 of the unit 12, thus making the inboard conveyor member that which operates the more slowly in each instance.

In practical operation, after the motor (not shown) of the machine is started, placing the conveyor members 34 and 36 in motion, articles, such as apples, are deposited into both aligning units 12 and 14 upon the upper runs 30 and 32 of the conveyor members 34 and 36 in the region of the drive pulleys 38 and 57, respectively, where the conveyor members 34 and 36 are disposed horizontally. Describing the action in the unit 12 only, the conveyor member 36 advances in the same direction as, and at a more rapid rate than, the conveyor member 34. Consequently, the apples will be advanced by the relatively moving conveyor members 34 and 36 is a sliding-rolling manner at a speed somewhere between the speed of the two conveyor members with which they are in contact when located in the apex of the trough. As the fruit is thus advanced, it is urged with gradually increasing force to gravitate into the bottom, or apex of the trough, whose sides become increasingly steeply inclined as the fruit progresses. Obviously, all of the apples will not immediately settle in the apex of the trough and some will bridge or rest partly upon one or the other of the conveyor members and/or against fruit in the apex of the trough. Bridging fruit which contacts the faster moving conveyor member 36, will be advanced more rapidly than that in the apex and will seek a space between fruit already disposed within the apex, and settle therein. Articles of fruit bridging other fruit and resting against the slowly moving conveyor, will be retarded in their advance relative to the fruit in the apex of the trough until they, too, eventually seat within the apex, thus causing all the fruit to be aligned in single file within the bottom, or apex of the trough. Thus it may be seen that the fruit processed by the machine of the present invention, is very rapidly aligned without the use of baffles, deflectors or other structure apt to bruise or abrade delicate fruit. Therefore, the fruit settles gently into the apex of the trough formed by the relatively moving, inclined conveyor members, where it is advanced in single file to the discharge end 42 of the machine. At the time of discharge of fruit from the machine (Figs. 2 and 3), fruit of any of a wide variety of sizes within the capacity of the machine will be perfectly aligned with the centers thereof in a common vertical plane.

Operation of the unit 14 is the same as that of the unit 12, and consequently the employment of two units serves to increase the capacity of the machine 10.

It may be understood that single, wide flat belts could be used in the place of the multiple belts of each conveyor member, but the employment of V-belts has been found to facilitate manufacture of the aligner as well as to provide spaces through which stems, twigs and small litter can be discharged from the machine during the aligning process, thus avoiding conveyance of such extraneous material into other processing machinery.

While a preferred embodiment of the present invention has been shown and described, it will be understood that various changes may be made without departing from the spirit of the invention and the scope of the appended claims.

Having thus described my invention, that which I desire to protect by Letters Patent is:

1. An article aligning machine comprising adjacently positioned movable conveyor members having article-supporting surfaces, means for moving the conveyor members at different speeds to advance articles supported on said surfaces, each of said surfaces being transversely horizontal adjacent one end of the surface and the other end of each surface being inclined downwardly toward the other conveyor member whereby the conveyor members cooperate to define a trough having sides which move relative to each other and which are of gradually increasing slope from one end to the other end of the conveyor member.

2. Apparatus for aligning articles comprising two movable conveyor members arranged in side-by-side relation, the receiving ends of both conveyor members being substantially transversely horizontal and in alignment with each other, the discharge ends of the conveyor members being transversely inclined downward and toward each other in V-shaped arrangement, and means for moving one of said conveyors forwardly relative to the other.

3. Apparatus for aligning articles comprising two movable conveyor members arranged in side-by-side relation, the receiving ends of both conveyor members being substantially transversely horizontal and in alignment with each other, the discharge ends of the conveyor members being transversely inclined downward and toward each other in V-shaped arrangement, and means for driving said conveyor members at different speeds.

4. An article aligning conveyor comprising adjacently positioned conveyor members having cooperating article-supporting surfaces, said surfaces being transversely horizontal at one end of the conveyor and downwardly inclined toward each other at the other end of the conveyor to form a trough whose sides become more steeply inclined toward the discharge end of the conveyor, and means for moving the conveyor members in the same direction and at different speeds to advance articles carried thereby.

5. An article aligning machine comprising two adjacently positioned conveyor members having cooperating article-supporting surfaces and means for driving said conveyors to advance the article-supporting surfaces in a common direction at different speeds, said cooperating article-supporting surfaces being increasingly transversely inclined from the horizontal to form a trough having an apex within which articles are aligned during advancement thereof on said surfaces, the articles in the apex of the trough being moved at a speed different from the speed of either of said conveyors or articles contacting only one of said conveyors whereby the articles in the apex of said trough will be advanced or retarded relative to other articles on said conveyors to allow the other articles to enter the apex of the trough.

6. An article aligning machine comprising a first pair of axially aligned horizontally disposed pulleys, a second pair of pulleys spaced from said axially aligned pulleys, the axes of said second pair of pulleys being inclined downwardly and toward each other, a pair of belts each of which is trained around one of said axially aligned pulleys and the associated one of said second pair of pulleys, the upper runs of said belts forming a trough whose sides incline toward each other, the inclination of said sides being of increasing pitch from the axially aligned pulleys to the second pair of pulleys, and means for driving said belts in the same direction and at different speeds to effect advance of articles supported on said upper runs of the belts.

7. Apparatus for arranging generally spherical articles in single file comprising two conveyor members arranged to be driven at different speeds and disposed in side-by-side arrangement, each of said members including a rotatably mounted pulley at each end thereof and a belt trained around both pulleys, the axis of rotation of one of the pulleys of each of said conveyor members being inclined with relation to the axis of rotation of the other pulley of the same conveyor member and the direction of inclination of said inclined axes being downward and toward each other whereby the conveyor members cooperate to define a trough having an apex and whose sides are of gradually increasing pitch from one end to the other of the conveyor members, and means for driving one conveyor member at a different forward speed than the speed of the other conveyor member whereby articles in the apex of said trough are advanced by said conveyor members at a speed different from the speed of either conveyor member.

8. An article aligning apparatus for rotatable articles comprising adjacently positioned movable conveyor members inclined downwardly and toward each other to define a trough having an apex and adapted to receive and advance articles to be aligned, and means for moving said conveyor members in parallel direction and at different relative speeds, the relative speed of the conveyor members and the inclination of said members being so chosen that articles in the trough are constantly urged downwardly towards the apex and an article in contact with one conveyor member is moved forwardly at a different speed than the forward speed of an adjacent article disposed in the apex.

References Cited in the file of this patent

UNITED STATES PATENTS

| | | |
|---|---|---|
| 290,715 | Steiner | Dec. 25, 1883 |
| 1,365,129 | Thornton | Jan. 11, 1921 |
| 1,729,269 | Jagenburg | Sept. 24, 1929 |
| 1,905,700 | Greenholt | Apr. 25, 1933 |
| 2,307,194 | Benning | Jan. 5, 1943 |
| 2,343,521 | Benning | Mar. 7, 1944 |